(12) United States Patent
Lang et al.

(10) Patent No.: US 7,697,210 B2
(45) Date of Patent: Apr. 13, 2010

(54) WIDE-ANGLE OBJECTIVE LENS SYSTEM AND CAMERA

(75) Inventors: Werner Lang, Ergersheim (DE); Michael Witzke, Ansbach (DE); Klaus Eckerl, Hutthurm (DE); Thomas Reinhard, Hutthurm (DE)

(73) Assignee: MEKRA Lang GmbH & Co. KG, Fuerth (DE)

( * ) Notice: Subject to any disclaimer, the term of this patent is extended or adjusted under 35 U.S.C. 154(b) by 6 days.

(21) Appl. No.: 11/891,154

(22) Filed: Aug. 9, 2007

(65) Prior Publication Data

US 2008/0037138 A1    Feb. 14, 2008

(30) Foreign Application Priority Data

| Aug. 10, 2006 | (DE) | .................. | 10 2006 037 566 |
| Aug. 10, 2006 | (DE) | .................. | 10 2006 037 568 |
| Oct. 30, 2006 | (DE) | .................. | 10 2006 051 194 |
| Oct. 30, 2006 | (DE) | .................. | 10 2006 051 195 |

(51) Int. Cl.
*G02B 3/00* (2006.01)
*G02B 9/00* (2006.01)
*G02B 13/04* (2006.01)

(52) U.S. Cl. .................. 359/649; 359/749; 359/754
(58) Field of Classification Search .................. 359/749, 359/753, 754, 767, 714, 648, 649

See application file for complete search history.

(56) References Cited

U.S. PATENT DOCUMENTS

| 5,602,676 | A | 2/1997 | Estelle |
| 5,973,850 | A | 10/1999 | Nagaoka |
| 2004/0021958 | A1 | 2/2004 | Mizuguchi |
| 2005/0219714 | A1 | 10/2005 | Nakayama |
| 2005/0225880 | A1 | 10/2005 | Imoto |
| 2005/0231817 | A1 | 10/2005 | Matsusaka |
| 2006/0012885 | A1* | 1/2006 | Beder et al. .................. 359/649 |

FOREIGN PATENT DOCUMENTS

| DE | 6606937 | 12/1970 |
| JP | 2002072085 | 9/2000 |
| JP | 2001 124970 | 5/2001 |
| JP | 2004 163986 | 6/2004 |

* cited by examiner

*Primary Examiner*—Alicia M Harrington
(74) *Attorney, Agent, or Firm*—Imperium Patent Works

(57) ABSTRACT

A vehicle camera and wide-angle objective lens system are disclosed wherein the wide-angle objective lens has image aberrations or errors that do not deteriorate the detection of obstructions or obstacles in its field of view.

24 Claims, 3 Drawing Sheets

WIDE-ANGLE OBJECTIVE LENS SYSTEM AND CAMERA

BACKGROUND OF THE INVENTION

The invention relates to a wide-angle objective lens system and a wide-angle camera incorporating the wide-angle lens system.

Today, in the case of motor vehicles, especially in regard to commercial vehicles, more and more cameras are being installed for the purpose of monitoring the area surrounding the vehicle. Panoramic cameras of types to serve such a purpose are rigidly affixed to a vehicle so that the camera has to encompass a wide area of sight or a wide-angled field of view. For this purpose cameras with comparatively inexpensive wide-angle objective lens systems are customarily installed.

These wide-angle objective lenses encompass a very wide field angle of 100° or more. However, this large field angle, i.e., this extensive extent of view, must be bought at the price of considerable distortion and reduced brightness in the outer edges of the displayed image. "Distortion" or "image distortion," means that straight lines in the edge areas of the object show themselves as curved in the produced image. It is important to distinguish a barrel-shaped distortion and a cushion-shaped distortion. Wide-angle lens system usually show a barrel-shaped distortion, i.e., expressed as positive figure. FIG. 3 illustrates examples of positive and negative image distortions. Image distortion is expressed as $$\left(\frac{y'-y}{y'}\right),$$

where y' represents the height of the image without distortion and y designates the height of the image with aberration. As a general rule, only the radial distortion, i. e. the change in lengths along radial distances, are considered. In the present application %-values for distortion designate this radial image distortion.

Where objective lenses are involved, and especially wide-angle objective lenses, a multiplicity of errors or aberrations in the produced images occur, which are known as the "Seven Seidel Aberrations" referring to the Seidel Error Theory. These seven Seidel Aberrations can be combined into three groups:

I) focus aberrations
 a) Spherical aberration, (differences in paraxial rays and marginal rays),
 b) coma, (light patching, with stringed tails),
 c) astigmatism, (formation of focal lines at points),
II) positional aberrations
 d) field curvature, (result of curved surface of image receiver),
 e) distortion, (convex or concave forms of outlines or barrel-shaped or cushion shaped outlines),
III) color aberration
 f) longitudinal color aberration
 g) transverse color aberration Each lens of an objective lens system possesses various properties such as the kind of glass, curvature expressed by the radii of the two lens surfaces) and the thickness of the lens. The arrangement of a plurality of lenses in an objective system becomes characterized by the separation distance of one lens from another, the position of an iris, and the back focus, i.e. the distance of the last lens surface to the plane of the recorded image. These characteristics become known as parameters or degrees of freedom. Theoretically, each of these degrees of freedom can be put to use to correct image aberrations. Contrary thereto, each degree of freedom takes part in all image aberrations. By customary use of optics software the proportionate image aberration for each single lens surface can be calculated.

In the following the work method of an optics designer will be explained by the aid of a pertinent example. This example is very important, since it presents the concept, of how an optics-designer proceeds and it shows decisive the creativity of the optics designer still is. It is possible to correct the seven aberrations with a minimum of eight independent system parameters. Focal length is also such a parameter. A triplet, i.e., a three-lens objective, could, as far as principle is concerned, suffice in this correction. A triplet is normally built-up from two converging outside members, e. g. made of crown glass, and one inner diverging member, e. g. made of flint glass. This assembly provides six radii and two distances between the individual lenses. To start with, the optics designer brings together optical system parameters such as the type of the glass, the thickness of the lenses, the separating distance between the lenses and also the radius of curvature of the glass surfaces. We have six lens surfaces and it is now possible to determine to what extent each contributes to the overall aberration in the final image. Very simplified, we could determine, that in a given case the radius of the second surface of the first lens produces a spherical and chromatic aberration, and the radii of the third lens surfaces produce coma and astigmatism.

The optics designer must now make a decision, as to how these aberrations are to be corrected. He may try to change the curvature of the first lens in order to correct for the spherical aberration. However, the curvature of the lens is also decisive for the focal length and the focal length should not be changed. The change of the curvature may reduce the spherical aberration but at the same time coma would be increased. The designer can also decide that the correction is to be distributed over a plurality of system parameters, in order to ameliorate the erroneous sensitivity. If a specific parameter is very decisive in order to correct for a certain aberration, one is in trouble, if the parameter is outside the allowed tolerance or clearance range during the production of the lens system. Or, one can also determine, that the clearance is too finely specified, and cannot be observed in the production of the lens system.

The optics designer will alter the system parameters up to such a point, that the remaining optical aberrations are small enough. In additional steps, he will attempt to correct each image aberration with different degrees of freedom simultaneously. The burden of the correction can then be distributed over the various lens surfaces and the entire system is no longer as critical. Within certain limitations, the optics designer has the possibility of specifying the types of glass and the degrees of curvature, although each chosen combination brings forth another aspect of the total correction. If the triplet has been so configured, that it approximates the pre-defined requirements, then the designer can, for example, determine that the astigmatism at the edge of the image has nearly vanished, but appears to play an important role in the inner field of view. At this point, we collide with a new problem. The seven Seidel aberrations, outlined above, are, unfortunately, not the only optical aberrations. One designates the Aberrations of Seidel as "Image aberrations of the Third Order". Logically, there are more aberrations of a higher order. The most important of these are the aberrations of the fifth and seventh order. These aberration groups are generally only to be encountered when the first group, the "third order" aberrations is properly corrected.

Theoretically, a very small point existing in the object is mapped into a very small point again. As a matter of practice, this does not occur because of the optical aberrations. A point will not reproduce as a point, but rather as a small disk with a varying distribution of brightness. As soon as these disks under-step a certain diameter, then the image errors become evident. That is a very simplified explanation. In reality, these aberrations are continually in force, but come to attention only if the residual aberrations of the third order are small.

The example given, i.e. the "Triplet Example", wherein the astigmatism in the field is still visible, shows the effect of these image aberrations of higher orders. One can make use of a defined and entirely controlled residue of the Seidel image aberrations in order to compensate for errors or aberrations of the fifth and seventh order. This is naturally, a limited measure and a triplet will have only an acceptable image quality, if the field angle and/or the iris opening is small.

It is important to note that a defined optical system, defined by the number and the configuration of the lenses etc., provides for limited correction possibilities. That means, in other words, even with sophisticated optics software and computer power only an experienced optics designer will choose the "right" starting parameters.

Computers, software and numerical methods are used in order to reduce optical aberrations. This equipment and procedures are be employed in order to optimize an optical system. This huge amount of data may cause its own problems. As a result, the task of the experts or optics designers has not become easier. Rather with the aid of computers an optics designer can consider more parameters and carry out the computations quicker and with greater accuracy.

A certain relationship exists between the number of design parameters of an optical system (lens curvature, lens thickness, distance of separation, refractive index etc.) and the degree of correction of the optical aberrations. With a greater degree of freedom and more design parameters, respectively, the optics designer has correspondingly more possibilities of correcting a system. If an optics designer applies a greater number of optical elements, then a better degree of correction can be attained. This, however, results in a considerable increase in costs, and further, the system may react strongly on the part of manufacturing clearances or increases in weight.

The designer of an optical system must then acquire a very good understanding of the fundamental optical possibilities of a given construction. All constructions or designs require an optimization system or plan in accord with a initial sketch. If the construction is not suitable for a fine compensation of aberrations, then the optics designer will attain only a product of lower quality.

A six lens objective system has 10 free lens surfaces (radii), six lens thicknesses (one per lens) with four separation-distances between the lenses. Additionally, each kind of glass has its own refractive index and dispersion number to consider. Further, it is necessary, that the exact position of the iris is to be determined. With these 36 parameters, i.e., degrees of freedom, the optics designer must correct more than 60 different image aberrations. Each parameter can present something like 10,000 individual values and one must calculate some 6,000 different ray paths for each parameter change.

These 36 degrees of freedom or parameters are also not entirely independent. Some must be combined; others are strongly limited by other parameters. Accordingly, the 36 degrees of freedom are reduced to something like 20, whereby the task becomes even more complex. In view of the given conditions and considerations, it is not surprising, that hundreds, if not thousands of designs may result, all of which very close or similar to the desired solution or design. The complete evaluation of a six lens objective system with the aid of fast computers and software that are able to calculate 10.000 lens surfaces per second approximately takes ten years.

Obviously, such a procedure is not feasible. In order to seek out the best solution to this unending succession of choices, the optics designer must have an inherent recognition of all the effects of the image aberrations on the final image quality of the displayed image. In addition, he must have the capability, to know those factors of image quality, which can produce the desired features of the optical system.

In a case of the application of wide angle objective lenses for the panoramic viewing of the immediate environment about a vehicle, there should be, first, the ability to encompass the greatest possible field of view, since the cameras are normally affixed rigidly to the vehicle. Second, the image aberrations, which will necessarily appear, must not deteriorate the recognition of obstacles within the field of view of the wide-angle lens system. Moreover, a wide-angle objective lens system cannot be designed in too complex a manner, since then it would be too expensive for use in a motor vehicle.

Thus it is an object of the present invention to make available an economical, wide-angle objective lens having image aberrations or errors that do not deteriorate the detection of obstructions or obstacles in its field of view. It is a further object o the present invention to provide a camera with such a wide-angle lens system.

SUMMARY OF THE INVENTION

Because the eventual placement of the wide-angle lens and, correspondingly, the wide-angle camera is on the outside of a vehicle, it is necessary that wide-angle cameras must be provided with a protective cover. In order not to change the optical characteristics and properties of the optical imaging system of the wide-angle camera these protective covers are conventionally designed with a shell or dome like contour. The costs for such shell like contours or dome shaped protective covers are high, particularly when one considers, that the optical properties of the protective cover must not interfere with optical properties of the wide-angle lens to be protected.

Because, in accordance with the invention, the protective cover consists of a flat, transparent plate, this formation is essentially cheaper. However, the flat plate must be considered in the calculation of the wide-angle lens as an included optical element. For this reason, surprisingly, the total costs for this addition to the present invention turns out to be less than corresponding costs using the conventional shell shaped protective cover.

Preferably, this protective cover has parallel surfaces on each flat side, since the optical effect of a parallel plane plate permits itself to be more convenient in the computation of the objective lens.

Glass adapts itself excellently as a material for the protective plate, since glass possesses excellent optical properties and, further, glass is very resistant to the environment. Since the diameter of the plate lies in the general range of 5 cm, the known breakage characteristics of the glass plays no role.

It has been recognized herein that an essential problem, which arises with the installation of wide-angle objective lenses in motor vehicle applications, is the image distortions which are inherent in such lenses, i.e., image distortions deteriorate a quick and easy recognition of obstructions within the field of view. Thus, according to the invention with a wide-angle lens system having a diagonal field of view of 118° or 120° the distortion is reduced by the wide-angle lens system itself to <10% and preferably <5%. With a wide-angle lens system having a diagonal field of view of 142° the distortion is reduced by the wide-angle lens system itself to <17% and preferably <15%. Although the automotive installation scope of the present invention excludes, because of costs, the installation of complex and refined wide-angle lens systems, nevertheless, the correction of the distortion is carried out by means of appropriate design of the lens system and not through electronic data processing of the captured images. Surprisingly, experience has shown that achieving this is possible at acceptable low costs.

According to an aspect of the invention, a reduction of image distortion is mainly achieved by means of using an aspherical lens. Preferably aspherical lens is concave-convex bi-aspherical in design, and the lens is positioned as the last lens in the wide-angle objective system adjacent to the image sensor, that is, just before the focal plane or image receiving plane of the image sensor.

According to a further aspect of the invention the optical assembly length or geometric length of the objective system is limited to 18 mm±5 mm for a wide-angle lens system having a diagonal field of view of 118°/120°, and to 21 mm±5 mm for a wide-angle lens system having a diagonal field of view of 142°. This forcibly requires first, a simple design and second, yields a wide-angle objective lens system, which is compact enough for installation in a motor vehicle.

According to a further aspect of the invention the wide-angle objective lens is comprised of five lenses at the most, whereby the first lens-group consists of three lenses at the most and the second lens-group consists of two lenses at the most. This number of lenses offers a satisfactory compromise between complexity of the objective lens and thus its price and adequate possibilities to correct image aberrations.

According to a further aspect of the invention, with a wide-angle lens system having a diagonal field of view of 118°/120° the iris, measured from the entrance aperture, is positioned at 60%±10% of the overall optical installation length of the lens system. With a wide-angle lens system having a diagonal field of view of 142° the iris is positioned at 75%±10% of the overall optical installation length of the lens system. Experience has shown that this location for the iris is particularly advantageous in reducing evolved aberrations and particularly diminishing image distortions, considering the small number of the lenses which are present.

According to a further aspect of the invention, the lenses of the first and the second lens-group are placed in direct contact with one another, without any spacer element or the like. In this way, an especially satisfactory length of assembly is gained, i.e., the overall dimensions of the lens system are reduced. Also clearances are maintained in a better manner, since the separating distances do not exist.

According to a further aspect of the invention, the optical iris has a diameter of 1.26 mm±0.5 mm in a wide-angle lens system having a diagonal field of view of 118°/120°, and a diameter of 0.85 mm±0.5 mm, with a wide-angle lens system having a diagonal field of view of 142°. The reduction of image distortion is particularly enhanced by this dimensioning.

According to a further aspect of the invention, the first lens-group comprises three lenses and the second lens-group encompasses two lenses. This combination of individual lenses, their positioning, and dimensioning has the effect of bringing about a very large field of view and at the same time creates a very small degree of distortion. The rest of the image aberrations hold themselves within tolerable limits.

According to a further aspect of the invention, the dimensioning of the five lenses provides satisfactory results in regard to the reduction of distortion and other optical characteristics of the wide-angle objective lens system in accord with the present invention.

According to a further aspect of the invention, the iris is created with a circular opening in a cylindrical boring. By this means, disturbing reflections due to grazing incident light in conically bored iris openings are avoided.

According to a further aspect of the invention, a flat, transparent, front protective plate is provided for the objective lens, instead of a conventional spherical or domed front cover. This creates the necessity, that the optical characteristics of the said plate must be given consideration in the computation of the wide-angle objective lens system. The increased costs associated therewith, however, are more than compensated for by the lesser expense of the flat plate in comparison to costs of the mentioned spherical or domed lens cover.

According to a further aspect of the invention, the first lens of the second lens-group is especially designed for the correction of field curvature or image bulging. By means of these corrections the spatially curved image surface of the wide-angle objective lens is adapted to that the plane surface of the image sensor. In other words, image aberrations are thereby corrected and minimize

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
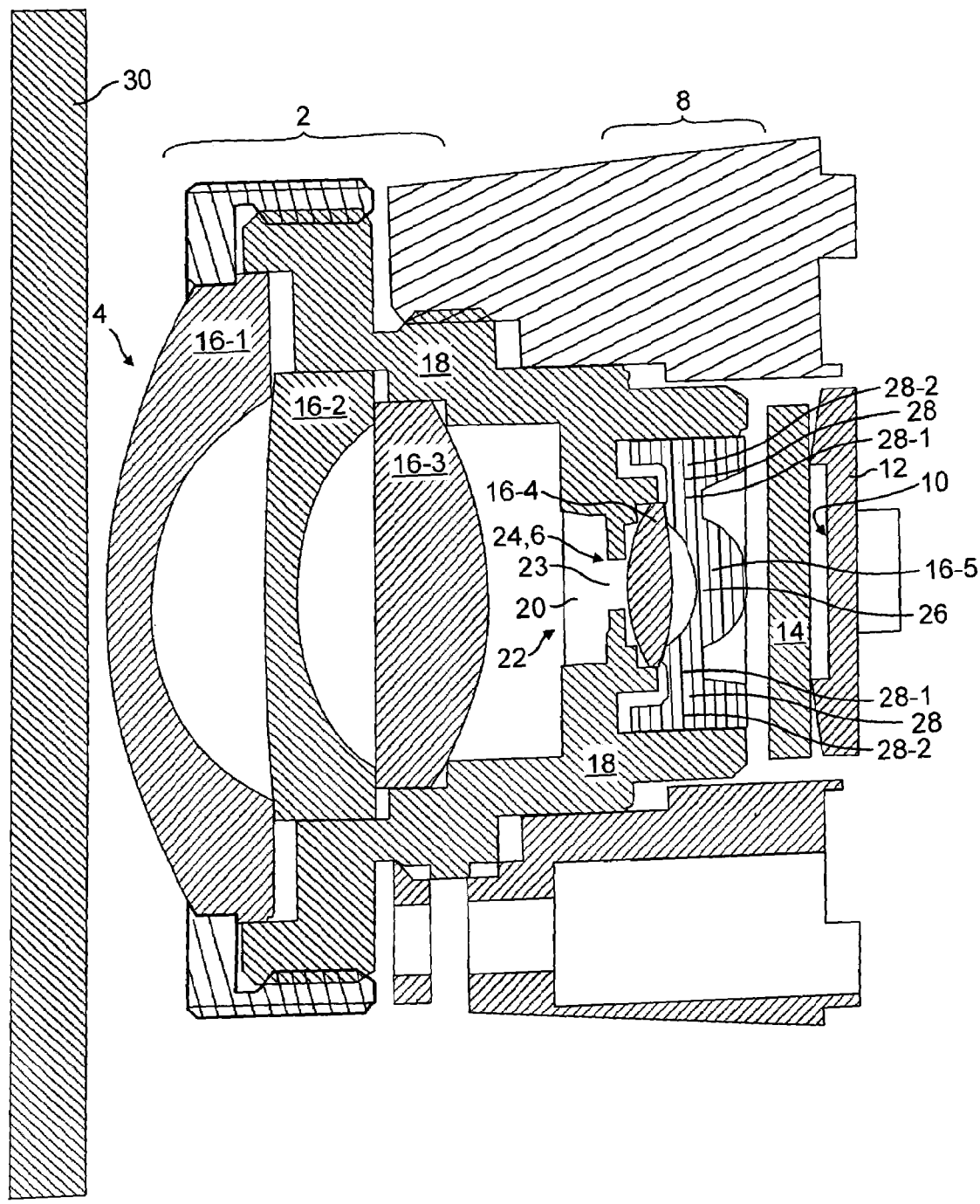
FIG. 1 a sectional drawing of an embodiment example of a wide-angle camera with an electronic image taking unit system in accord with the present invention.
Figure 2:
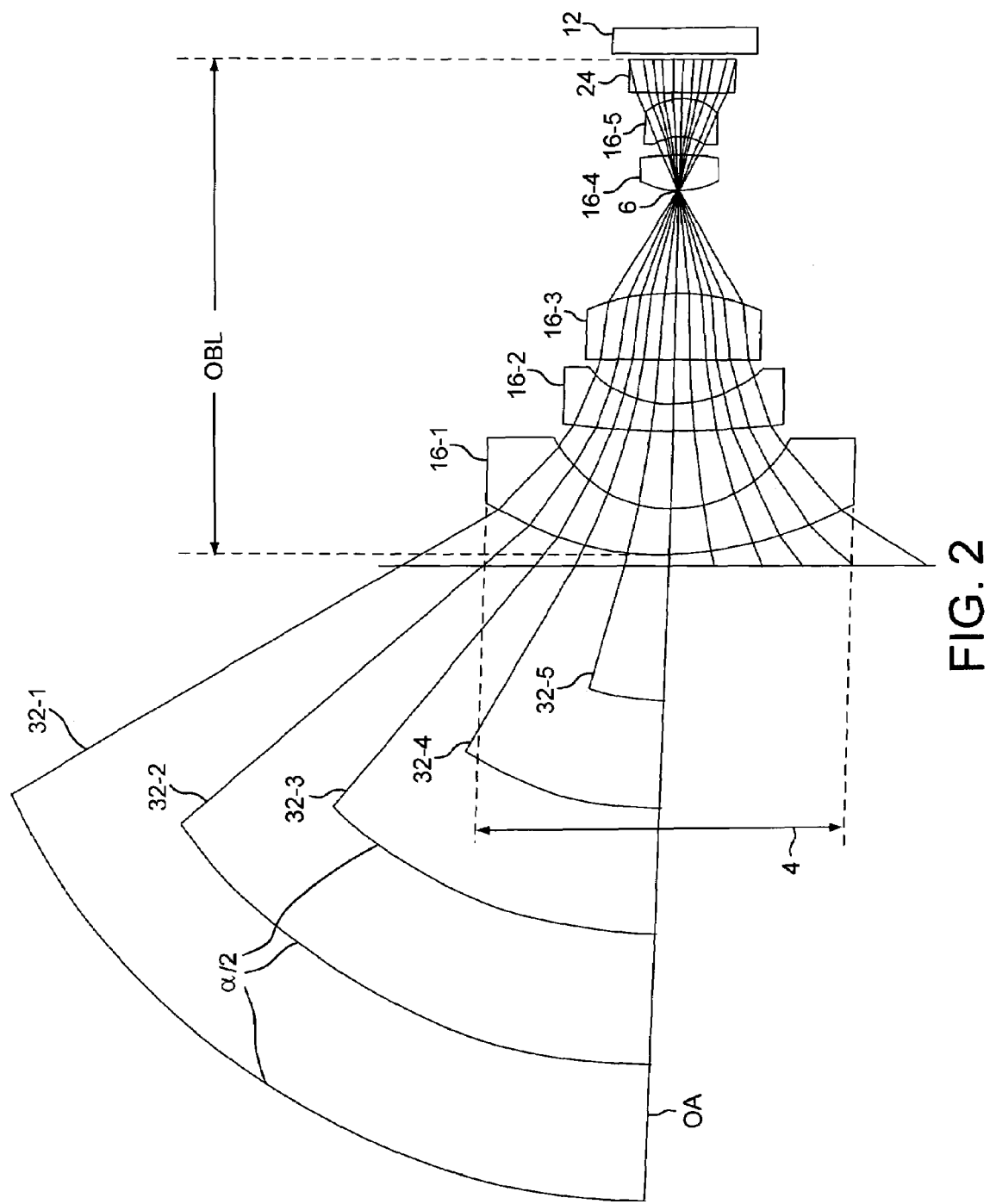
FIG. 2 an optical, function diagram of the embodiment example of FIG. 1 with a presentation of the path of rays from various angles of the field of exposure.
Figure 3:
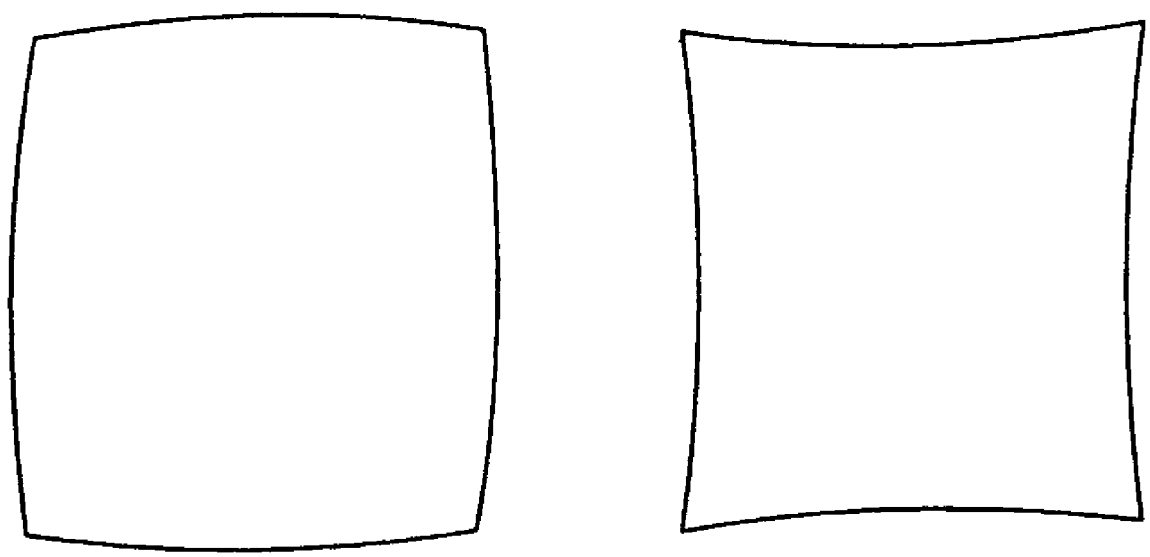
FIG. 3 a schematic presentation of distortion, depicted as one of the Seidel Aberrations.

FIGS. 1, 2 show an exemplary embodiment of the invention. FIG. 1 illustrates a wide-angle camera with a wide-angle objective lens system in accord with the present invention depicted in a longitudinal section along the optical axis of the objective. FIG. 2 presents the path of rays through the wide-angle objective system in accord with FIG. 1, shown embracing various view angles designated as α and α/2, respectively.

Light from a target object (on the left side of FIGS. 1 and 2, not shown) converges from a field angle α to enter a first lens-group 2, which has an entrance aperture 4. Following the direction of incident light from the object to be taken, i.e., for example, to be photographed, behind the first lens-group 2 is located an optical iris 6. In turn, behind the optical iris 6 is provided a second lens-group 8. Following the second lens-group 8, adjacent a flat image surface or focal plane 10, is located an electronic image capture unit in the form of a CCD-sensor 12 with a plurality of pixels. Between CCD-sensor 12 and second lens-group 8 is located an IR-cut filter 14 (IR=Infra Red). IR rays are filtered-out through the said IR-cut filter 14, as these would lead to a degradation of the quality of the image. This is especially true for the presentation of colour in the case of colour cameras, since where a high proportion of IR rays are present, the color effect is diminished in quality.

The first lens-group 2 includes a first lens 16-1, a second lens 16-2 and a third lens 16-3. The second lens-group 8 consists of a fourth lens 16-4 and a fifth lens 16-5. The lenses 16-1, 16-2 and 16-3 of the first lens-group 2 are placed in contact with one another, i.e., no separating distance or spacer element is provided between them. Likewise, the forth lens 16-4 and the fifth lens 16-5 are also contiguous in the same manner. In this case, the larger fifth lens 16-5 acts as a holder for the smaller fourth lens 16-4. All five lenses 16-1 to 16-5 are retained in place by a lens retainer 18. Retainer 18 grips or contacts the five lenses 16-1 to 16-5 at their radial rims. The left side opening of the lens retainer 18 also defines the size of the entrance aperture 4.

The optical iris 6 is positioned immediately in front of the fourth lens 16-4. The iris 6 is formed by the shape of the lens retainer 18 in the space between the third and the fourth lenses 16-3, 16-4. The iris 6 is formed in a part of the lens retainer 18 extending across the optical axis OA and comprises a blind boring 20 having a cylindrical shape forming an entrance aperture 22 of the iris 6. At the bottom of cylindrical blind boring 20 is a second boring 23 forming an exit port 24 allowing light to pass through the iris arrangement. The diameter of blind boring 20 is larger than the diameter of second boring 23. Blind boring 20 and second boring 23 are designed to symmetrically encircle the optical axis OA of the objective lens system in lens retainer 18. Exit port 24 is placed immediately in front of fourth lens 16-4 and its diameter determines the size or diameter of iris 6. By means of the cylindrical shape of the boring 20 instead of the common cone shape, the transmission of grazing light through iris 6, which would lead to undesirable reflections, is avoided.

In the following the specific data and decisive optical parameters for two exemplary embodiments of the invention are given. The structure of two embodiments is very similar so that FIGS. 1 and 2 are representations of both embodiments.

The first embodiment of the invention has a field of view α of 118° or 120°. In the first embodiment the first lens 16-1 is convex-concave in shape and possesses radii of $R_{11}$ and $R_{12}$ for the curvatures of the respective lens surfaces, as may be seen in Table 1 which follows. The second lens 16-2 is likewise convex-concave with a first radius $R_{21}$, and a second radius $R_{22}$. The third lens is biconvex with a first radius $R_{31}$ and a second radius $R_{32}$. The fourth lens is also biconvex shaped with respective radii designated $R_{41}$, $R_{42}$. The fifth lens is a concave-convex, aspherical lens. The thicknesses, diameters, and refractive indices of the five lenses 16-1, -2, -3, -4, -5 as well as their separation distances are shown in the following table 1:

TABLE 1

| | symbol | radii/mm | thickness/ mm | refraction no. nd/587 nm | diameter/mm |
|---|---|---|---|---|---|
| first lens 16-1 | R11 | +11.60 | 1.50 | 1.79 | 16.00 |
| | R12 | −5.20 | | | |
| air space | | | 3.00 | | |
| second lens 16-2 | R21 | +45.20 | 0.80 | 1.77 | 11.00 |
| | R22 | −6.10 | | | |
| air space | | | 1.60 | | |
| third lens 16-3 | R31 | +44.90 | 2.90 | 1.84 | 9.50 |
| | R32 | +10.90 | | | |
| air space | | | 4.00 | | |
| Iris | | | 0.04 | | 1.26 |
| fourth lens | R41 | +4.30 | 1.40 | 1.77 | 4.00 |

TABLE 1-continued

| | symbol | radii/mm | thickness/ mm | refraction no. nd/587 nm | diameter/mm |
|---|---|---|---|---|---|
| 16-4 | R42 | +7.80 | | | |
| air space | | | 0.90 | | |
| fifth lens | R51 | −0.53 | 1.00 | 1.53 | 2.40 |
| 16-5 | R52 | +1.10 | | | 2.90 |

The diameter for the fifth lens 16-5 given in table 3 is the effective optical diameter.

The aspheric coefficients "c" and the conical constants K of the fifth lens 16-5 of the first embodiment are given in the following table 2:

TABLE 2

| | aspherical coefficients | | | | Conical |
|---|---|---|---|---|---|
| Radii | C2 | C4 | C6 | C8 | constant K |
| R51 | 0.65470 | 0.06311 | 0.08367 | 0.03340 | −0.84600 |
| R52 | 0.02660 | 0.03690 | 0.01090 | 0.01770 | −0.50240 |

The circular entrance aperture 4 has a diameter of 14 mm and the iris 6 has a diameter of 1.26 mm.

A second embodiment of the invention has a field of view α of 142°.

In the second embodiment the first lens 16-1 is convex-concave in shape and possesses radii of $R_{11}$ and $R_{12}$ for the curvatures of the respective lens surfaces, as may be seen in Table 3 below. The second lens 16-2 is likewise convex-concave with a first radius $R_{21}$, and a second radius $R_{22}$. The third lens is piano-convex with a first radius $R_{31}$ and a second radius $R_{32}$. The fourth lens is also biconvex shaped with respective radii designated $R_{41}$, $R_{42}$. The fifth lens is a concave-convex, aspherical lens. The thicknesses, diameters, and refractive indices of the five lenses 16-I as well as their separation distances are shown in the following table 3:

TABLE 3

| | symbol | radii/mm | thickness/ mm | refraction no. nd/587 nm | diameter/mm |
|---|---|---|---|---|---|
| first lens | R11 | +13.73 | 0.84 | 1.77 | 16.,00 |
| 16-1 | R12 | −4.75 | | | |
| air space | | | 3.11 | | |
| second lens | R21 | +153.44 | 0.72 | 1.79 | 11.,00 |
| 16-2 | R22 | −6.04 | | | |
| air space | | | 1.62 | | |
| third lens | R31 | ∞ | 3.66 | 1.85 | 9.50 |
| 16-3 | R32 | +8.54 | | | |
| air space | | | 3.74 | | |
| Iris | | | 0.01 | | 0.85 |
| fourth lens | R41 | +6.80 | 1.24 | 1.75 | 4.00 |
| 16-4 | R42 | +4.22 | | | |
| air space | | | 0.83 | | |
| fifth lens | R51 | −0.42 | 1.24 | 1.53 | 2.10 |
| 16-5 | R52 | +0.59 | | | 2.72 |

The diameter for the fifth lens 16-5 given in table 3 is the effective optical diameter. The diameter of the fifth lens 16-5 as three-dimensional object is 7 mm.

The aspheric coefficients "c" and the conical constants K of the fifth lens 16-5 of the second embodiment can be seen in the following table 4:

TABLE 4

| Radii | aspherical coefficients | | | | conical constant K |
|---|---|---|---|---|---|
| | C2 | C4 | C6 | C8 | |
| R51 | 0.92546 | 0.17160 | 0.22119 | −0.00761 | −0.88956 |
| R52 | 0.32994 | 0.18753 | −0.03589 | 0.06766 | −0.83027 |

In the second embodiment the circular entrance aperture 4 has a diameter of 15.6 mm and the iris 6 has a diameter of 0.85 mm.

As to the mathematical representation of the aspherical surfaces of the fifth lens 16-5, reference is made for both embodiments to the textbook: Naumann/Schröder, *Bauelement der Optik, Taschenbuch for Technischen Optik*, Vol. 5, published 1987, pages 145ff.

In both embodiments the fifth lens 16-5 is composed of plastic and is constructed as one piece. The fifth lens 16-5 comprises a lens component 26 and a holding means 28. The lens component 26 comprises an aspherical, concave-convex lens, which provides for the optical function of the fifth lens 16-5. The holding means 28 extends itself circularly away from the lens component 26, whereby, in a sectional view (see FIG. 1) said holding part 28 consists of two T-shaped elements, which extend—see the FIG. 1—from the rim of the lens component 26, in both upward and downward directions. Accordingly, the holding means 28 encompasses a first section 28-1 of circular, annular shape with a rectangular cross-section, which connects itself directly onto the rim of the lens component 26. Attached to outside of the first section 28-1 is cylindrical second section 28-2 of rectangular cross section. The second section 28-2 is arranged transversely to the first section 28-1. The second section 28-2 of the holding means 28 abuts against the lens supporting structure 18. The annular first section 28-1 serves as a supporting surface for the fourth lens 16-4. The fourth lens 16-4 is thus in direct contact with the fifth lens 16-5 without a spacer element there between and the fourth lens 16-4 abuts against the first annular section 28-1 of the fifth lens 16-5. That part of the lens retainer 18, which encircles the exit port 24 of the iris 6, holds and supports the fourth lens 16-4. Furthermore, the first, second and third lenses, 16-1, 16-2 and 16-3 mutually support each other at their rim circumferences and are further supported in the radial direction by the lens holder or lens retainer 18.

Immediately in front of the first lens 16-1 a transparent protective covering in the form of a parallel-surfaced, plate 30 is arranged. Plate 30 guards the wide-angle objective lens from influences of the environment. The provision of the parallel-surfaced, transparent plate 30, instead of the usual means for conventional cameras, namely spherical or dome shaped front covers, introduces the condition that the optical characteristics of the plate 30 must be taken into consideration in the computation of the wide-angle lens. This additional expense, however, is fully compensated for by the essentially lower costs of the parallel surfaced plate 30, when its expense is compared to that of the mentioned spherical protective transparent cover.

FIG. 2 presents an optical function diagram of the embodiments shown in FIG. 1 and shows the arrangement of the five lenses 16-1 to 16-5 along the optical axis OA of the wide-angle objective lens system in accord with the present invention. In FIG. 2 the optical constructive length of the wide-angle lens system, i.e., the distance between the forward edge of the first lens 16-1 and the image surface of the image sensor 12 or focal plane 10 is depicted. In the case of the first embodiment of the invention, the optical constructive length is 18 mm in case of the second embodiment the optical construction length is 21.4 mm.

In FIG. 2 the path of rays 32-1 to 32-5 for five different field of view angles $\alpha$ is shown. The maximum field of view angle $\alpha$ is represented by path ray 32-1. For the sake of clarity, in FIG. 2 there is shown only the symbol for $\alpha/2$, this being the angle between the optical axis OA and the respective incident ray path 32-i. Additionally, in FIG. 2 the thickness and the radial extent of the individual lenses 16-1 to 16-5 are depicted.

While a preferred embodiment of the invention has been described using specific terms, such description is for illustrative purposes only, and it is to be understood that changes and variations may be made without departing from the spirit or scope of the following claims.

What is claimed is:

1. A wide-angle objective lens system comprising:
 a first lens group having a plurality of lenses;
 an entrance aperture for the gathering of light from an object over a diagonal field angle $\alpha$ of 118°±10°;
 an optical iris arranged behind said first lens group; and
 a second lens group arranged behind said optical iris, wherein said second lens group projects light from the first lens group which has passed through said iris to impinge on an image surface with an image distortion of <5%, and wherein said optical iris is located at 60%±10% of the optical construction length (OBL) relative to the entrance aperture.

2. The system of claim 1 wherein said optical iris has a diameter of 1.26 mm±0.5 mm.

3. The system of claim 1 wherein said first lens group includes a first, second and third lens and said second lens group comprises a fourth and a fifth lens; said first lens is convex-concave with a first radius of 11.6 mm±δ% and a second radius of −5.2 mm±δ%; said second lens is convex-concave with a first radius of 45.2 mm±δ% and a second radius of −6.1 mm±δ%; said third lens is biconvex with a first radius of 44.9 mm±δ% and a second radius of 10.9 mm±δ%; said fourth lens is biconvex with a first radius of 4.3 mm±δ% and a second radius of 7.8 mm±δ%; said fifth lens is concave-convex biosphere; and ±δ% lies in a range between 1% and 15%.

4. The system of claim 3 wherein said first lens has a refractive index of about 1.79.

5. The system of claim 3 wherein said second lens has a index of refraction of about 1.77.

6. The system of claim 3 wherein said third lens has a refraction of about 1.84.

7. The system of claim 3 wherein said fourth lens has a refraction of about 1.77.

8. The system of claim 3 wherein said fifth lens has a refraction of about 1.53.

9. The system of claim 3 wherein said fourth lens is designed to correct the distortion or aberrational swelling or curvature of the image.

10. The system of claim 1 further comprising:
 a lens holder wherein said optical iris includes a cylindrical boring formed in said lens holder, wherein said optical iris has an iris opening in a bottom of said cylindrical boring, and wherein said diameter of said cylindrical boring is larger than that of said optical iris.

11. A wide-angle objective lens system, comprising:
 a first lens group having an entrance aperture for the gathering of light from an object over a diagonal field angle a of 142°±10°;
 an optical iris arranged behind said first lens group;

a second lens group arranged behind said optical iris; and an image surface, wherein said second group projects light from said first lens group which has passed through said optical iris to impinge upon said image surface with an image distortion of <17%, and wherein an optical constructed length (OBL) of said wide-angle objective lens measures 21.4 mm±5 mm.

12. A wide-angle objective lens system, comprising:

a first lens group having an entrance aperture for the gathering of light from an object over a diagonal field angle a of 142°±10°;

an optical iris arranged behind said first lens group;

a second lens group arranged behind said optical iris; and an image surface, wherein said second group projects light from said first lens group which has passed through said optical iris to impinge upon said image surface with an image distortion of <17%, and wherein said optical iris is placed at 75%±10% of the optical construction length (OBL) relative to the entrance aperture.

13. The system of claim 12 wherein said optical iris has a diameter of 0.85 mm±0.5 mm.

14. The system of claim 12 wherein said first lens group comprises a first, second and third lens and said second lens group comprises a fourth and a fifth lens, said first lens is convex-concave with a first radius of 13.7 mm±δ% and a second radius of −4.7 mm±δ%; said second lens is convex-concave with a first radius of 153.4 mm±δ% and a second radius of −6.0 mm±δ%; said third lens is plano-convex with a first radius of ∞ and with a second radius of 8.5 mm±δ%; said fourth lens is biconvex with a first radius of 6.8 mm±δ% and a second radius of 4.2 mm±δ%; said fifth lens is concave-convex biosphere; and δ% lies in a range between 1% and 15%.

15. The system of claim 14 wherein said first lens has a refractive index of about 1.77.

16. The system of claim 14 wherein said second lens has a refraction index of about 1.79.

17. The system of claim 14 wherein said third lens has a refraction index of about 1.85.

18. The system of claim 14 wherein said fourth lens has a refraction index of about 1.75.

19. The system of claim 14 wherein said fifth lens has a refraction index of about 1.53.

20. The system of claim 14 wherein said fourth lens is designed to correct a distortion or aberrational swelling or curvature of the image.

21. The system of claim 12, further comprising:

a lens holder, wherein said optical iris includes a cylindrical boring formed in said lens holder, wherein said optical iris has an iris opening in a bottom of said cylindrical boring, and wherein said diameter of said cylindrical boring is larger than that of said optical iris.

22. The system of claim 12, further comprising:

a transparent protective plate disposed before said entrance aperture.

23. The system of claim 22 wherein said protective plate is a parallel surfaced plate.

24. The system of claim 22 wherein said plate is a glass plate.

* * * * *